United States Patent
Hahn et al.

(10) Patent No.: US 11,359,045 B2
(45) Date of Patent: Jun. 14, 2022

(54) METHOD FOR PRODUCING ISOCYANATE MIXTURES CONTAINING ISOCYANURATE GROUPS

(71) Applicant: Covestro Deutschland AG, Leverkusen (DE)

(72) Inventors: Christian Hahn, Leverkusen (DE); Hans-Detlef Arntz, Overath (DE); Stephan Schubert, Leverkusen (DE); Ernst Felske, Neuss (DE); Claudia Houben, Heinsberg (DE); Frank Behrendt, Langenfeld (DE)

(73) Assignee: Covestro Deutschland AG, Leverkusen (DE)

( * ) Notice: Subject to any disclaimer, the term of this patent is extended or adjusted under 35 U.S.C. 154(b) by 142 days.

(21) Appl. No.: 16/768,735

(22) PCT Filed: Dec. 14, 2018

(86) PCT No.: PCT/EP2018/084856
§ 371 (c)(1),
(2) Date: Jun. 1, 2020

(87) PCT Pub. No.: WO2019/121348
PCT Pub. Date: Jun. 27, 2019

(65) Prior Publication Data
US 2021/0171699 A1    Jun. 10, 2021

(30) Foreign Application Priority Data

Dec. 21, 2017 (EP) .................................. 17209262

(51) Int. Cl.
*C08G 18/18* (2006.01)
*C08G 18/76* (2006.01)
*C08G 18/02* (2006.01)

(52) U.S. Cl.
CPC ....... *C08G 18/1866* (2013.01); *C08G 18/022* (2013.01); *C08G 18/1825* (2013.01); *C08G 18/7671* (2013.01)

(58) Field of Classification Search
CPC .............. C08G 18/022; C08G 18/1866; C08G 18/1825
See application file for complete search history.

(56) References Cited

U.S. PATENT DOCUMENTS 4,518,729 A * 5/1985 Breidenbach ........ C08G 18/022
156/331.7
4,675,401 A * 6/1987 Robin .................. C07D 251/34
544/193

(Continued)

FOREIGN PATENT DOCUMENTS

DE   102004060121 A1   6/2006
WO      2009039332 A1   3/2009

OTHER PUBLICATIONS

International Search Report, PCT/EP2018/084856, dated Mar. 6, 2019, Authorized officer: Martin Sütterlin.

*Primary Examiner* — Michael L Leonard
(74) *Attorney, Agent, or Firm* — Donald R. Palladino

(57) ABSTRACT

The invention relates to a continuous method for producing an isocyanurate-containing isocyanate mixture, in which in a step a) a mixture of a first and a second isocyanate component and an isocyanate group trimerization catalyst is provided; in a step b) the mixture obtained in step a) is reacted in a first residence time zone at an elevated temperature; in a step c), the reaction mixture obtained in step b) is further heated in a second residence time zone, optionally after adding a stopper; and in a step d), the reaction mixture obtained in step c) is cooled down in a third (Continued)

residence time zone by way of lowering the temperature, thus obtaining the desired isocyanurate-containing isocyanate mixture.

20 Claims, 1 Drawing Sheet

(56) References Cited

U.S. PATENT DOCUMENTS

| | | | |
|---|---|---|---|
| 4,743,672 A | 5/1988 | Goel | |
| 10,577,311 B2 | 3/2020 | Knauf et al. | |
| 2003/0013834 A1* | 1/2003 | Slack | C08G 18/795 528/44 |

* cited by examiner

METHOD FOR PRODUCING ISOCYANATE MIXTURES CONTAINING ISOCYANURATE GROUPS

CROSS-REFERENCE TO RELATED APPLICATIONS

This application is a national stage application under 35 U.S.C. § 371 of PCT/EP2018/084856, filed Dec. 14, 2018, which claims the benefit of European Application No. 17209262.9, filed Dec. 21, 2017, each of which is incorporated herein by reference.

FIELD

The present invention relates to a continuous process for preparing an isocyanurate-containing isocyanate mixture, in which in a step a) a mixture of a first and second isocyanate component and an isocyanate group trimerization catalyst is provided, in a step b) the mixture obtained in step a) is converted in a first dwell zone at elevated temperature, in a step c) the reaction mixture obtained in step b), optionally after addition of a stopper, is heated further in a second dwell zone, and in a step d) the reaction mixture obtained in step c) is cooled down by lowering the temperature in a third dwell zone to obtain the desired isocyanurate-containing isocyanate mixture.

BACKGROUND

The trimerization of organic isocyanates R—NCO to isocyanurates is known in the art.

Scheme 1: The isocyanurate structural element.

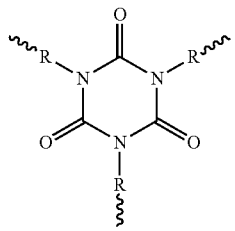

R = organic radical.

Isocyanurate-containing isocyanates can be used advantageously in order, for example, to improve the high-temperature characteristics, fire properties or aging characteristics of polyurethanes (PUR); these are then referred to as polyisocyanurate-containing (PIR-containing) polyurethanes. For this purpose, it has been found to be useful not to conduct the trimerization reaction during the actual polyurethane formation since the trimerization in conjunction with the PUR formation reaction causes a further rise in temperature (in addition to the rise in temperature as a result of the exothermicity of the formation of the PUR bonds) and a further pressure rise in the case of foaming reactions (as is the case for conventional PUR/PIR foams with a PIR formation reaction immediately after the PUR formation reaction in the same foaming process), and at a time when the polymer formation is already far advanced and, as a result, the incipient adhesion of the polymer to interfaces (for example a metallic carrier) can be parted again by the shear forces that occur. It has therefore been found to be useful first to prepare mixtures of isocyanurates and unmodified isocyanates and then to use these to conduct the PUR formation reaction.

WO 2009/039332 A1 is concerned with the objective of enabling the selective production of MDI with elevated viscosity and functionality to an enhanced degree without simultaneously increasing the amount of bicyclic MDI produced. For this purpose, the application teaches trimerizing conventional MDI (a mixture of bicyclic MDI [MMDI] and the higher homologs containing 3 or more aromatic rings [PMDI]) in the presence of a suitable catalyst, deactivating the catalyst and finally blending the mixture thus obtained with conventional MDI to such a degree that a product having the desired viscosity and the desired NCO content is obtained. All that are described are batchwise processes.

U.S. Pat. No. 4,743,672 is concerned with the preparation of liquid PMDI-containing MDI products having a high bicyclic content and comparatively high viscosity. For this purpose, the application teaches converting MDI in the presence of a trimerization catalyst to obtain an isocyanurate-containing polyisocyanate, deactivating the trimerization catalyst and then blending the isocyanurate-containing polyisocyanate thus obtained with standard PMDI compositions. All that are described are batchwise processes. The application further teaches that stable isocyanate products are not obtainable by premixing bicyclic MDI with PMDI compositions and subsequent isocyanurate formation.

The batchwise processes known in the art for preparation of isocyanurate-containing isocyanate mixtures generally entail the use of a chemical stopper to stop the trimerization reaction at the desired degree of trimerization. Moreover, temperature control can be a challenge in the case of exothermic reactions conducted batchwise, especially on the industrial scale. The known processes for preparing isocyanurate-containing isocyanate mixtures can also lead to an elevated content of dimeric isocyanate (called the uretdione), which results in turbidity of the end product.

German patent application DE 10 2004 060 121 A1 is concerned with the object of providing a continuous process for preparing isocyanurate group-containing polyisocyanates with which a polyisocyanate having a low color number can be obtained. This object is achieved by a continuously operated process for partial oligomerization of isocyanates, especially of hexamethylene 1,6-diisocyanate, isophorone diisocyanate, dicyclohexylmethane 4,4'-diisocyanate, 2,2,4- and/or 2,4,4-trimethylhexamethylene 1,6-diisocyanate and mixtures thereof, in the presence of at least one catalyst, which is especially characterized in that the total content in the catalyst of hydrolyzable halogen is less than 1% by weight.

The isocyanate- and catalyst-containing reactant streams that have optionally been premixed in a stage a) are guided through a reaction zone in a stage b). Stage b) may optionally be followed by further reaction in a tubular reactor (stage c)). The reaction is preferably stopped on attainment of the desired degree of conversion in a stage d) by deactivating the catalyst, for example by adding a deactivating agent, by thermal breakdown of the catalyst or by cooling.

In general, stage b) consists of two or more backmixed reaction zones. In general, the temperature in the backmixed reactor system is between 40° C. and 170° C., preferably between 45° C. and 160° C., more preferably between 50° C. and 150° C., and most preferably between 60° C. and 140° C. In a particular embodiment of stage b), the individual reaction zones are heated to different temperatures and operated with different residence times. In this regard, it is disclosed that it could be sensible, for example, to raise the reaction temperature along the reaction zones, such that the temperature in the second reaction zone, for example, is higher than in the first reaction zone by 5° C., preferably by 10° C., more preferably by 15° C. and most preferably by 20° C. Moreover, in any third reaction zone present, the temperature could be increased further by 5° C., preferably by 10° C., more preferably by 15° C. and most preferably by 20° C. It could be sensible here to heat this last reaction zone to a temperature above 80° C., preferably 100° C., more preferably 120° C., in order to thermally deactivate the catalyst. An embodiment disclosed as an alternative is one in which this third section is not heated further but cooled down to a temperature below 50° C., preferably 45° C., more preferably 40° C., in order to stop the reaction. In these cases, there is no step c) (since step d) is already being conducted in the last stage of step b)). As an example (to adapt to the conditions required for the diisocyanate to be trimerized with regard to the temperature conditions) of a process regime with deactivation by cooling, it is disclosed that the first reaction zone should be divided into a mixing and/or preheating zone (appropriately with a temperature of about 40° C. to 60° C.), the second into a reaction zone (appropriately with a temperature of about 70° C. to 120° C.), and the last into a catalyst deactivation zone or cooling zone (appropriately with a temperature of about 20° C. to 40° C.).

This continuous process too is not free of disadvantages. For instance, the particularly preferred temperature for thermal catalyst deactivation of 120° C. is too low to be able to reliably assure low uretdione contents. No combination of continuous thermal deactivation at sufficiently high temperature and subsequent, sufficiently rapid continuous cooling can be inferred from this document.

SUMMARY

Further improvements in this field of industry would therefore be desirable. More particularly, it would be desirable to have available a process for preparing isocyanurate-containing isocyanate mixtures that has the aforementioned problems at least to a reduced degree, if at all, and leads to storage-stable liquid homogeneous (non-cloudy) products. It has been found that, completely surprisingly, a continuous process regime using multiple temperature levels as described below can provide a remedy in this regard.

Taking account of the above, the invention relates to a process for preparing an isocyanurate-containing isocyanate mixture, comprising the steps of:
 a) continuously providing an isocyanate mixture comprising isocyanate group trimerization catalyst by mixing a first isocyanate component (K1), a second isocyanate component (K2) different from the first, and an isocyanate group trimerization catalyst (K3) (mixing step);
 b) continuously guiding the isocyanate mixture comprising isocyanate group trimerization catalyst that has been provided in step a) through a first dwell zone at a temperature in the range from 50° C. to 120° C., preferably from 60° C. to 110° C., more preferably from 70° C. to 100° C., to obtain a uretdione- and isocyanurate-containing isocyanate mixture comprising isocyanate group trimerization catalyst (trimerization step);
 c) continuously guiding the uretdione- and isocyanurate-containing isocyanate mixture comprising isocyanate group trimerization catalyst that has been obtained in step b) through a second dwell zone at a temperature in the range from 160° C. to 220° C., preferably from 170° C. to 215° C., more preferably from 180° C. to 210° C., to obtain an isocyanurate-containing isocyanate mixture (comprising inactive isocyanate group trimerization catalyst), wherein the guiding through the second dwell zone may be preceded by the addition of a stopper at a temperature in the temperature range of step b) (inactivation and redissociation step);
 d) continuously guiding the isocyanurate-containing isocyanate mixture (comprising inactive isocyanate group trimerization catalyst) obtained in step c) through a third dwell zone at a temperature in the range from 10° C. to 100° C., preferably from 15° C. to 80° C., more preferably from 20° C. to 50° C., to obtain the desired isocyanurate-containing isocyanate mixture (comprising inactive isocyanate group trimerization catalyst) ("quenching" step).

In the process of the invention, process steps a) to d) are performed continuously. What this means in the present context is that, during the period of production of a desired isocyanurate-containing isocyanate mixture, the starting materials for a process step are fed continuously thereto and the products from the respective process step are withdrawn continuously therefrom. This comprises production of discrete batches of a desired isocyanurate-containing isocyanate mixture. For example, a batch of a particular isocyanurate-containing isocyanate mixture can be continuously produced until the desired amount has been dispensed into one or more vessels, which may be followed by the production of another isocyanurate-containing isocyanate mixture. This procedure is encompassed by the inventive use of the term continuous, irrespective of whether or not there is a significant production stoppage between the two production cycles.

Two isocyanate components (K1, K2) are different from one another in the context of the present invention when they are different in terms of at least one parameter selected from the NCO content determined according to DIN EN ISO 11909:2007-05 and a viscosity at 40° C. determined by rotary viscometer according to DIN 53019-1:2008-09 (taking account of unavoidable measurement variations).

In the context of the present invention, isocyanate group trimerization catalysts are understood to mean all catalysts capable of catalyzing the trimerization of isocyanate groups to isocyanurate groups (see scheme 1 further up) under the temperature conditions of step b). In the context of the present invention, reference is made to an inactive isocyanate group trimerization catalyst when the catalyst no longer catalyzes the trimerization of isocyanate groups to isocyanurate groups under the respective temperature conditions. Particular preference is given to matching the choice of isocyanate group trimerization catalyst and the temperature conditions in step c) to one another such that the isocyanate group trimerization catalyst is irreversibly deactivated.

What follows first is a brief summary of different possible embodiments of the invention, although the enumeration of embodiments should be considered to be nonexhaustive:

In a first embodiment of the invention, step a) comprises continuously introducing the first isocyanate component (K1), the second isocyanate component (K2) different from the first, and the isocyanate group trimerization catalyst (K3) into a mixing device and mixing the isocyanate components (K1, K2) introduced and the trimerization catalyst (K3) introduced to obtain the isocyanate mixture comprising isocyanate group trimerization catalyst.

In a second embodiment of the invention, step a) comprises the following component steps:

a.1) continuously introducing one of the two isocyanate components (K1, K2) and the isocyanate group trimerization catalyst (K3) into a first mixing device (M1) and mixing the isocyanate component introduced and the isocyanate group trimerization catalyst (K3) introduced to obtain a mixture comprising one of the two isocyanate components (K1, K2) and the isocyanate group trimerization catalyst (K3);

a.2) continuously introducing the mixture which is obtained in step a.1) and comprises one of the two isocyanate components (K1, K2) and the isocyanate group trimerization catalyst (K3), and the other isocyanate component into a second mixing device (M2) and mixing the mixture comprising one of the two isocyanate components (K1, K2) and isocyanate group trimerization catalyst (K3) introduced and the other isocyanate group component introduced to obtain the isocyanate mixture comprising isocyanate group trimerization catalyst.

In a third embodiment of the invention, step a) comprises the following component steps:

a.1) continuously introducing the first isocyanate component (K1) and the second isocyanate component (K2) different from the first into a first mixing device (M1) and mixing the isocyanate components introduced in this first mixing device (M1) to obtain an isocyanate mixture;

a.2) continuously introducing the isocyanate group trimerization catalyst (K3) and the isocyanate mixture obtained in step a.1) into a second mixing device (M2) and mixing the isocyanate mixture introduced and the isocyanate group trimerization catalyst (K3) introduced to obtain the isocyanate mixture comprising isocyanate group trimerization catalyst.

In a fourth embodiment of the invention, which is a particular configuration of the third embodiment, in step a), the isocyanate mixture leaving the mixing device (M1) continuously, before it enters the second mixing device (M2), is guided through a ("zeroth") dwell zone upstream of the second mixing device (M2).

In a fifth embodiment of the invention, which may be combined with all other embodiments, step a) is performed at a temperature in the range from 10° C. to <50° C.

In a sixth embodiment of the invention, which may be combined with all other embodiments, but especially with the fifth embodiment, the temperature of the isocyanate mixture comprising isocyanate group trimerization catalyst which is obtained in step a) is adjusted to the temperature in step b) at a rate of temperature change in the range from 2° C./min to 90° C./min, preferably from 5° C./min to 60° C./min, more preferably from 15° C./min to 55° C./min.

In a seventh embodiment of the invention, which may be combined with all other embodiments, but especially with the sixth embodiment, the temperature of the uretdione- and isocyanurate-containing isocyanate mixture comprising isocyanate group trimerization catalyst which is obtained in step b) is adjusted to the temperature in step c) at a rate of temperature change in the range from 10° C./min to 160° C./min, preferably from 10° C./min to 100° C./min, more preferably from 25° C./min to 85° C./min.

In an eighth embodiment of the invention, which may be combined with all other embodiments, but especially with the seventh embodiment, the temperature of the isocyanurate-containing isocyanate mixture comprising inactive isocyanate group trimerization catalyst which is obtained in step c) is adjusted to the temperature in step d) at a rate of temperature change in the range from 15° C./min to 200° C./min, preferably in the range from 15° C./min to 125° C./min, more preferably in the range from 35° C./min to 105° C./min.

In a ninth embodiment of the invention, which can be combined with all other embodiments, the nature and composition of the first and second isocyanate component are in each case matched to one another in such a way that the isocyanurate-containing isocyanate mixture obtained in step d) has an NCO content in the range from 24% by mass to 32% by mass and a viscosity in the range from 50 mPa·s (25° C.) to 40 000 mPa·s (25° C.).

In a tenth embodiment of the invention, which can be combined with all other embodiments, but especially with the ninth embodiment, the first isocyanate component (K1) and second isocyanate component (K2) are each selected from the group consisting of (i) methylene diphenylene diisocyanate, (ii) mixtures of methylene diphenylene diisocyanate and polymethylene polyphenylene polyisocyanate, (iii) tolylene diisocyanate and (iv) mixtures of (i) or (ii) with (iii).

In an eleventh embodiment of the invention, which is a particular configuration of the tenth embodiment, the first isocyanate component (K1) used is methylene diphenylene diisocyanate and the second isocyanate component (K2) used is a mixture of methylene diphenylene diisocyanate and polymethylene polyphenylene polyisocyanate.

In a twelfth embodiment of the invention, which is a particular configuration of the eleventh embodiment, the mass ratio of methylene diphenylene diisocyanate to polymethylene polyphenylene polyisocyanate in the mixture of first and second isocyanate component is adjusted to a value in the range from 70:30 to 95:5 (i.e. 2.33 to 19).

In a thirteenth embodiment of the invention, which is a particular configuration of the tenth to twelfth embodiments, the NCO content of the first isocyanate component (K1) and of the second isocyanate component (K2) are each in the range from 30% by mass to 49% by mass, and the viscosity of the first isocyanate component (K1) and the second isocyanate component (K2) are each in the range from 2.50 mPa·s to 800 mPa·s (40° C.).

In a fourteenth embodiment of the invention, which is a particular configuration of the first to thirteenth embodiments, the isocyanate group trimerization catalyst used in step a) is selected from the group consisting of quaternary ammonium hydroxides, alkali metal hydroxides, alkali metal alkoxides, trialkylphosphines, para-substituted pyridines, organometallic salts, Lewis acids and alkali metal salts of organic acids.

In a fifteenth embodiment of the invention, which is a particular configuration of the fourteenth embodiment, a stopper comprising an organic acid chloride is added in step c), where the organic acid chloride is used in a molar ratio of acid chloride:isocyanate group trimerization catalyst in the range from 1:3 to 1:1.

In a sixteenth embodiment of the invention, which is another particular configuration of the first to thirteenth embodiments, the isocyanate group trimerization catalyst used in step a) comprises an alkylaminoalkylphenol, preferably tris(dimethylaminomethyl)phenol, and is especially an alkylaminoalkylphenol, preferably tris(dimethylaminomethyl)phenol.

In a seventeenth embodiment of the invention, which is a particular configuration of the sixteenth embodiment, no stopper is used to inactivate the isocyanate group trimerization catalyst (i.e. the inactivation is effected purely by thermal means).

In an eighteenth embodiment of the invention, which is a particular configuration of the fourth to seventeenth embodiments, the "zeroth" dwell zone upstream of the second mixing device (M2) used is a tubular reactor optionally containing mixing elements.

In a nineteenth embodiment of the invention, which can be combined with all other embodiments that do not envisage dynamic mixing devices for step a), only static mixing devices are used in step a).

In a twentieth embodiment of the invention, which can be combined with all other embodiments, the first, second and third dwell zone each comprise a stirred tank, optionally with upstream heat exchanger, or a temperature-controllable tubular reactor optionally containing mixing elements.

In a twenty-first embodiment of the invention, which is a particular configuration of the twentieth embodiment, the first, second and third dwell zone each comprise a stirred tank, optionally with upstream heat exchanger.

In a twenty-second embodiment of the invention, which is another particular configuration of the twentieth embodiment, the first, second and third dwell zone each comprise a temperature-controllable tubular reactor optionally containing mixing elements.

In a twenty-third embodiment of the invention, which can be combined with all other embodiments apart from the twenty-fourth embodiment described below, the first and second isocyanate components are each taken from a product stream from the corresponding isocyanate production plant.

In a twenty-fourth embodiment of the invention, which can be combined with all other embodiments apart from the twenty-third embodiment described above, the first and second isocyanate components are each taken from a storage or transport vessel not connected to the corresponding isocyanate production plant.

The embodiments briefly outlined above and further possible configurations of the invention are elucidated in detail hereinafter. Various embodiments are combinable with one another as desired unless the opposite is clearly apparent to those skilled in the art from the context.

Figure 1:
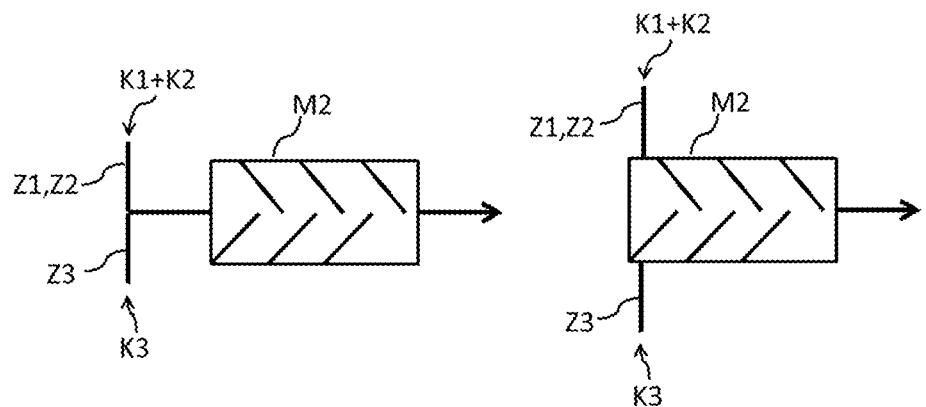
FIGS. 1-3 show possible apparatus configurations for carrying out procedure γ) according to some implementations.

The continuous providing of an isocyanate mixture comprising isocyanate group trimerization catalyst by mixing a first isocyanate component (K1), a second isocyanate component (K2) different from the first, and an isocyanate group trimerization catalyst (K3) in step a)—the mixing step—can in principle be effected in all ways familiar to the person skilled in the art.

α) It is possible to introduce the components to be mixed—the first isocyanate component (K1), the second isocyanate component (K2) different from the first, and the isocyanate group trimerization catalyst (K3)—continuously into a mixing apparatus, to mix them and then to feed them directly to step b).

β) It is likewise possible first to mix one of the two isocyanate components (K1 or K2) with the isocyanate group trimerization catalyst (K3) continuously in a first mixing device (M1) and to mix the other isocyanate component with the mixture of one of the isocyanate components and the isocyanate group trimerization catalyst (K3) thus obtained continuously in a second mixing device (M2) connected downstream of the first mixing device (M2) for flow purposes. In this embodiment, therefore, the continuous providing of an isocyanate mixture comprising isocyanate group trimerization catalyst by mixing a first isocyanate component (K1), a second isocyanate component (K2) different from the first, and an isocyanate group trimerization catalyst (K3) is accomplished by the steps of:

a.1) continuously introducing one of the two isocyanate components (K1, K2) and the isocyanate group trimerization catalyst (K3) into a first mixing device (M1) and mixing the isocyanate component introduced and the isocyanate group trimerization catalyst (K3) introduced to obtain a mixture comprising one of the two isocyanate components (K1, K2) and the isocyanate group trimerization catalyst (K3);

a.2) continuously introducing the mixture which is obtained in step a.1) and comprises one of the two isocyanate components (K1, K2) and the isocyanate group trimerization catalyst (K3), and the other isocyanate component into a second mixing device (M2) and mixing the mixture comprising one of the two isocyanate components (K1, K2) and isocyanate group trimerization catalyst (K3) introduced and the other isocyanate group component introduced to obtain the isocyanate mixture comprising isocyanate group trimerization catalyst.

γ) Another, likewise two-stage embodiment of step a) comprises the mixing first of the two isocyanate components (K1, K2) in a first mixing device (M1), followed by continuous mixing of the isocyanate group trimerization catalyst (K3) with the isocyanate mixture thus obtained in a second mixing device (M2) connected downstream of the first mixing device (M1) for flow purposes. In this embodiment, therefore, the continuous providing of an isocyanate mixture comprising isocyanate group trimerization catalyst by mixing a first isocyanate component (K1), a second isocyanate component (K2) different from the first, and an isocyanate group trimerization catalyst (K3) is accomplished by the steps of:

a.1) continuously introducing the first isocyanate component (K1) and the second isocyanate component (K2) different from the first into a first mixing device (M1) and mixing the isocyanate components introduced in this first mixing device (M1) to obtain an isocyanate mixture;

a.2) continuously introducing an isocyanate group trimerization catalyst (K3) and the isocyanate mixture obtained in step a.1) into a second mixing device (M2) and mixing the isocyanate mixture introduced and the isocyanate group trimerization catalyst (K3) introduced to obtain the isocyanate mixture comprising isocyanate group trimerization catalyst.

Figure 2:
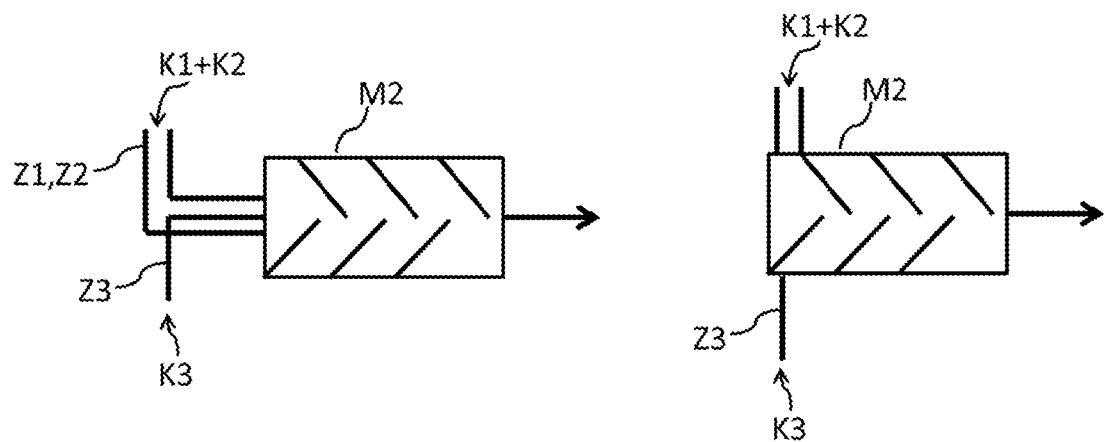
Figure 3:
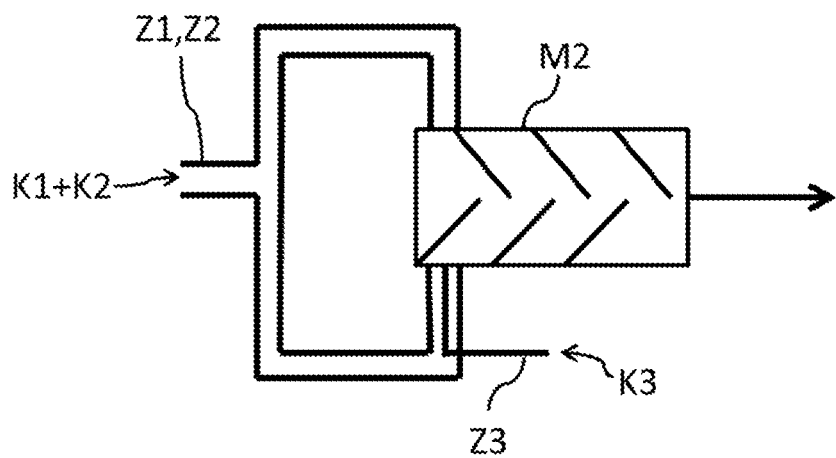

The latter procedure (γ) is preferred since it has the advantage that the isocyanate group trimerization catalyst (K3) is only added once the desired mixture of isocyanates is already present, such that trimerization of one of the isocyanate components alone can be reliably ruled out. The drawings FIG. 1 to FIG. 3 show possible apparatus configurations of this embodiment.

It may be advisable to provide further dwell time for completion of the mixing between the last mixing operation in step a) and step b) and/or, if conducted, between step a1) and step a2). This can be accomplished by increasing the dwell time in the mixing device, for example by reducing the flow rate through the mixing device or preferably by—at a given flow rate—extending the distance traveled by the mixture through the mixing device by making it sufficiently large or connecting multiple mixing devices in series. It is also possible to provide further dwell time by virtue of passage through a dwell apparatus downstream of the mixing device.

The providing of further dwell time may possibly be advisable after every mixing of two components, but this embodiment is especially preferred in the embodiment γ) between steps a.1) and a.2). It is preferable here that the isocyanate mixture leaving the mixing device (M1) continuously, before being introduced into the second mixing device (M2), is guided through a ("zeroth") dwell zone upstream of the second mixing device (M2), which is preferably a tubular reactor optionally containing mixing elements.

In each case, it is preferable to conduct step a) at a temperature in the range from 10° C. to <50° C., preferably from 15° C. to 45° C., more preferably from 20° C. to 40° C. If step a) comprises multiple component steps, this is true of each of the component steps (including any "zeroth" dwell zone to be passed through). By complying with the temperature ranges mentioned, early onset of the trimerization reaction in step a) is largely to completely avoided, such that the trimerization essentially takes place only in step b) under controlled conditions. Early commencement of trimerization in step a) should be avoided as far as possible in order to ensure controlled reaction conditions.

Suitable isocyanate group trimerization catalysts (K3) to be used in step a) are preferably quaternary ammonium hydroxides, alkali metal hydroxides, alkali metal alkoxides, trialkylphosphines, alkylaminoalkylphenols, para-substituted pyridines, organometallic salts, Lewis acids and alkali metal salts of organic acids. The isocyanate group trimerization catalyst (K3) is preferably used in the form of a solution of a proportion by mass of isocyanate group trimerization catalyst (K3) in the range from 5 to 15 (based on the total mass of the solution (cf. examples 1 and 2)) in a non-isocyanate-reactive solvent, such that a molar ratio of isocyanate group trimerization catalyst to isocyanates in the range from 0.05:99.95 to 0.50:99.50 is achieved.

Particular preference is given to the use of alkylaminoalkylphenols since these are irreversibly deactivated in step c) even without the use of a stopper, and unwanted further reactions are therefore avoided. Particular mention should be made here of tris(dimethylaminomethyl)phenol.

Suitable mixing devices to be used in step a) are in principle all mixing devices known to the person skilled in the art. It is possible to use either static mixing devices (in which the mixing of at least two liquid streams is brought about without moving parts) or dynamic mixing devices (in which the mixing of at least two liquid streams is brought about using moving parts).

Examples of suitable dynamic mixing devices are stirred tanks and rotor-stator mixers. Dynamic mixing devices may be sourced, for example, from Cavitron Verfahrenstechnik, BWS Technologie GmbH and Kinematica; known names are Cavitron®, Supratron® and Megatron®. Examples of suitable static mixing devices are mixing pipes having static mixing internals, where it is also possible to use microstructures. Mixing pipes having static mixing internals are frequently simply called "static mixers". Such static mixing devices may be sourced, for example, from Sulzer, Fluitec, Stamixco and Ehrfeld Mikrotechnik Known names are SMX mixers, Kenics mixers, CMX mixers and micro-mixers.

If two mixing devices are used in step a) (embodiments β) and γ)), it is possible for both mixing devices to be either dynamic mixing devices or static mixing devices. It is also possible that the first mixing device (M1) is a dynamic mixing device and the second mixing device (M2) is a static mixing device, or the first mixing device (M1) is a static mixing device and the second mixing device (M2) is a dynamic mixing device.

Static mixing devices are preferred because they have good crossmixing. This brings about a narrow dwell time distribution and improved heat transfer.

FIG. 1 shows two options for the use of a static mixer in step a.2) in the most preferred embodiment γ): The isocyanate mixture (K1+K2) obtained in step a.1) is mixed by means of a static mixer (M2) with the isocyanate group trimerization catalyst (K3) (preferably as a solution as described above). It is possible here for the two liquid streams to reach the mixer via a T-piece (FIG. 1, left-hand half; Z3 denotes the feed for K3, and Z1, Z2 the feed for the mixture of K1+K2), or for the liquid streams to be fed to the mixer from the side (FIG. 1, right-hand half). In a further preferred process, preference is given to mixing of the two liquid streams with an equal or at least similar flow rate since there can otherwise be poorer mixing, which can result in elevated by-product and deposit formation. Since the volume flow rates of isocyanate mixture and isocyanate group trimerization catalyst (K3) are significantly different, it is preferable to reduce the internal diameter of the pipeline for the catalyst stream that leads to the static mixer by comparison with the internal diameter of the corresponding pipeline for the stream of isocyanate mixture (FIG. 2 shows, by way of example, two options for step a.2) of embodiment γ)). It is possible here to encase the pipeline having the smaller diameter—K3—with that having the greater diameter—isocyanate mixture K1+K2—as shown in the left-hand half of FIG. 2.

In a further preferred embodiment of the process of the invention, the stream of isocyanate mixture K1+K2 is divided upstream of the mixer and guided laterally into the mixer from two sides. From one side of the mixer, the pipeline for the catalyst stream K3 is introduced into the pipeline for the isocyanate mixture. The three streams only meet in the mixer. This is shown by way of example in FIG. 3 for step a.2) of embodiment γ). This procedure was followed in examples 2 to 4.

Suitable first and second isocyanate components (K1, K2) for use in step a) are in principle all trimerizable organic isocyanates. The process according to the invention is particularly suitable for preparation of those isocyanurate-containing isocyanate mixtures having an NCO content in the range from 24% by mass to 32% by mass and a viscosity at 25° C. in the range from 50 mPa·s to 40 000 mPa·s. The NCO content is considered here to be the value determined in accordance with DIN EN ISO 11909:2007-05. The crucial viscosity value is considered here to be the value determined by rotary viscometer in accordance with DIN 53019-1:2008-09. As well as the reaction parameters in further steps (especially the temperature in step b)), these values depend on the nature (whether, for example, methylene diphenylene diisocyanate, a mixture of methylene diphenylene diisocyanate and polymethylene polyphenylene polyisocyanate or tolylene diisocyanate is used) and composition (for example isomer ratio, mixing ratio) of the isocyanate components to be used, which have to be matched correspondingly, which is a matter of routine to the person skilled in the art. The first isocyanate component (K1) used is preferably a component having an NCO content in the range from 30% by mass to 49% by mass and a viscosity at 40° C. in the range from 1.50 mPa·s to 800 mPa·s. The second isocyanate component (K2) used is preferably a component having an NCO content in the range from 30% by mass to 49% by mass and a viscosity at 40° C. in the range from 2.50 mPa·s to 800 mPa·s. With the proviso that at least one of the NCO content and viscosity parameters is different, NCO content and viscosity of the two isocyanate components are adjustable independently of one another within these ranges.

Suitable isocyanate components are especially the di- and polyisocyanates of the diphenylmethane series, and tolylene diisocyanate. Diisocyanates of the diphenylmethane series are the isomers of methylene diphenylene diisocyanate (called monomer MDI, MMDI, also referred to as 2-ring MDI). Polyisocyanates of the diphenylmethane series are the higher homologs thereof, the polymethylene polyphenylene polyisocyanates containing three or more aromatic rings (and correspondingly 3 or more isocyanate groups) (called polymer MDI, PMDI). In practice, PMDI is only of significance in a mixture with MMDI since pure PMDI has too high a viscosity for practical purposes. Preference is given here to mixtures of methylene diphenylene diisocyanate and polymethylene polyphenylene polyisocyanate having a mass ratio of MMDI:PMDI in the range from 20:80 to 55:45 (i.e. in the range from 0.25 to 1.22).

The first isocyanate component (K1) is thus preferably selected from the group consisting of (i) methylene diphenylene diisocyanate, (ii) mixtures of methylene diphenylene diisocyanate and polymethylene polyphenylene polyisocyanate, (iii) tolylene diisocyanate and (iv) mixtures of (i) or (ii) with (iii). The second isocyanate component (K2) is preferably likewise selected from this group, with the proviso that the second isocyanate component is different from the first in terms of viscosity and/or NCO content as elucidated above. For example, the first isocyanate component (K1) used may be methylene diphenylene diisocyanate and the second isocyanate component (K2) tolylene diisocyanate, or the first isocyanate component (K1) used may be tolylene diisocyanate and the second isocyanate component (K2) a mixture of methylene diphenylene diisocyanate and polymethylene polyphenylene polyisocyanate. It is likewise possible to use a methylene diphenylene diisocyanate component as each of the first and second isocyanate components, these differing in terms of their viscosity owing to different isomer distribution.

More preferably, the first isocyanate component (K1) used in step a) is methylene diphenylene diisocyanate, and the second isocyanate component (K2) a mixture of methylene diphenylene diisocyanate and polymethylene polyphenylene polyisocyanate, where the mixture (K2) especially has a mass ratio of MMDI:PMDI in the range from 20:80 to 55:45 (i.e. in the range from 0.25 to 1.22). It is preferable here that the mass ratio of MMDI:PMDI in the mixture of first and second isocyanate component is in the range from 70:30 to 95:5 (i.e. in the range from 2.33 to 19).

In all embodiments in which a mixture of methylene diphenylene diisocyanate and polymethylene polyphenylene polyisocyanate is used in step a), it is preferable that this mixture has a total chlorine content in the range from 500 ppm to 2000 ppm, preferably in the range from 600 ppm to 2000 ppm, more preferably in the range from 650 ppm to 2000 ppm. Test methods for the determination of total chlorine content, for example x-ray fluorescence or Wickbold combustion in conjunction with titration with silver nitrate are known to the person skilled in the art. In the case of doubt, the definitive determination is according to DIN 51 577 (Part 4) of February 1994. Calibration is accomplished using samples of ortho-dichlorobenzene in a matrix of a distilled methylene diphenylene diisocyanate isomer mixture (having a negligible total chlorine content) which is liquid at room temperature. More particularly, an isomer mixture of 2,4'-methylene diphenylene diisocyanate and 4,4'-methylene diphenylene diisocyanate in a mass ratio of 1:1 is used. However, the isomer distribution is only of significance in that the isomer mixture must be liquid at room temperature.

In step b) of the process of the invention, the trimerization step, the temperature is increased such that the trimerization reaction to form the isocyanurate groups sets in. This is brought about by guiding the isocyanate mixture comprising isocyanate group trimerization catalyst that has been obtained in step a) (in embodiments β) and γ) more specifically: in step a.2)) continuously through a first dwell zone at a temperature in the range from 50° C. to 120° C., preferably from 60° C. to 110° C., more preferably from 70° C. to 100° C., to obtain a uretdione- and isocyanurate-containing isocyanate mixture comprising isocyanate group trimerization catalyst. The formation of uretdione groups is undesirable but cannot be entirely prevented at this point.

The dwell time of the isocyanate mixture comprising isocyanate group trimerization catalyst in the first dwell zone is preferably in the range from 1 min to 240 min, more preferably in the range from 20 min to 150 min and most preferably in the range from 30 min to 60 min. The first dwell zone may be a reaction device known to the person skilled in the art, especially a stirred tank, optionally with upstream heat exchanger, or—preferably—a temperature-controllable tubular reactor that may optionally contain mixing elements. In the case of a stirred tank with an upstream heat exchanger, the isocyanate mixture which comprises isocyanate group trimerization catalyst and is obtained in step a) is heated up to the temperature of step b) in this heat exchanger by indirect heating; if no heat exchanger is provided, the heating is effected solely by appropriate heating of the stirred tank. In the case of a tubular reactor, this is heated correspondingly. In any case, it is preferable to adjust the temperature of the isocyanate mixture comprising isocyanate group trimerization catalyst which is obtained in step a) to the temperature in step b) at a rate of temperature change in the range from 2° C./min to 90° C./min, preferably from 5° C./min to 60° C./min, more preferably from 15° C./min to 55° C./min.

In step c) of the process of the invention, the inactivation and redissociation step, the temperature is increased further relative to step b) in a second dwell zone, specifically to values at which the activity of the isocyanate group trimerization catalyst is lost (especially irreversibly) (optionally assisted by the addition of a stopper), and uretdione formed in step b) is redissociated to isocyanate. The use of chemical stoppers is dispensable in preferred embodiments of the process of the invention because the isocyanate group trimerization catalysts used are those that are inactivated purely thermally—i.e. by the continuous guiding of the uretdione- and isocyanurate-containing isocyanate mixture that comprises isocyanate group trimerization catalyst and is obtained in step b) through the second dwell zone at a temperature in the range from 160° C. to 220° C., preferably from 170° C. to 215° C., more preferably from 180° C. to 210° C.—to obtain the isocyanurate-containing isocyanate mixture comprising inactive isocyanate group trimerization catalyst. This purely thermal inactivation is enabled through the use of particular isocyanate group trimerization catalysts such as, in particular, the alkylaminoalkylphenols (among which tris(dimethylaminomethyl)phenol is particularly preferred). The extent to which other isocyanate group trimerization catalysts are purely thermally inactivatable under the particular temperature conditions chosen in step c), in the case of doubt, can be ascertained by the person skilled in the art by simple preliminary tests.

If an isocyanate group trimerization catalyst that is not inactivated even in the upper range of the temperatures that are possible in step c) is used, it is appropriate, prior to the guiding through the second dwell zone, to add a stopper at a temperature in the temperature range of step b). In this embodiment, step c) therefore comprises the following two component steps:

c.1) adding a stopper to the uretdione- and isocyanurate-containing isocyanate mixture which comprises isocyanate group trimerization catalyst and is obtained in step b) within the temperature range of step b), i.e. at a temperature in the range from 50° C. to 120° C., preferably from 60° C. to 110° C., more preferably from 70° C. to 100° C., especially at the same temperature at which step b) is conducted;

c.2) guiding the stopper-containing uretdione- and isocyanurate-containing isocyanate mixture comprising isocyanate group trimerization catalyst through a second dwell zone at a temperature in the range from 160° C. to 220° C., preferably from 170° C. to 215° C., more preferably from 180° C. to 210° C., to obtain an isocyanurate-containing isocyanate mixture comprising inactive isocyanate group trimerization catalyst.

In the case of performance of step c.1), the stopper to be used is preferably an organic acid chloride or a mixture of multiple organic acid chlorides, especially benzoyl chloride, phthaloyl chloride or a mixture of the two. The stopper is preferably used in a molar ratio of 1:3 to 1:1 based on the amount of the catalyst used. When a tubular reactor is used as the first dwell zone, the stopper, for this purpose, can be introduced into the lower end of the tubular reactor for flow purposes. When a continuous-flow stirred tank is used as the first dwell zone, the stopper can be added to the mixture leaving the stirred tank before it is guided into the second dwell zone. Preferably, however, the stopper is added to the mixture obtained in step b) by means of a further mixing apparatus disposed between the first dwell zone and the second dwell zone. This ensures that the uretdione- and isocyanurate-containing isocyanate mixture which comprises isocyanate group trimerization catalyst and is obtained in step b) and the stopper are sufficiently mixed before introduction into the second dwell zone.

The use of an isocyanate group trimerization catalyst which is not completely inactivatable in step c) without addition of a stopper is not preferred since—according to the manner of later use of the isocyanate mixture to be prepared—it is not possible to rule out a disruptive effect of the isocyanate group trimerization catalyst. If this procedure is nevertheless to be followed, the temperature in the third dwell zone (step d); see below) is always kept below the temperature of step d) and this prevents renewed "lightoff" of the trimerization reaction.

The dwell time of the uretdione- and isocyanurate-containing isocyanate mixture comprising isocyanate group trimerization catalyst in the second dwell zone is preferably in the range from 1 min to 60 min, more preferably in the range from 1 min to 10 min and most preferably in the range from 1.5 min to 5 min. The second dwell zone, like the first, may be a reaction device known to the person skilled in the art, especially a stirred tank, optionally with upstream heat exchanger, or—preferably—a temperature-controllable tubular reactor that may optionally contain mixing elements. In the case of a stirred tank with an upstream heat exchanger, the uretdione- and isocyanurate-containing isocyanate mixture which comprises isocyanate group trimerization catalyst and is obtained in step b) is heated up to the temperature of step c) in this heat exchanger by indirect heating; if no heat exchanger is provided, the heating is effected solely by appropriate heating of the stirred tank. In the case of a tubular reactor, this is heated correspondingly. In any case, it is preferable to adjust the temperature of the uretdione- and isocyanurate-containing isocyanate mixture comprising isocyanate group trimerization catalyst which is obtained in step b) to the temperature in step c) at a rate of temperature change in the range from 10° C./min to 160° C./min, preferably from 10° C./min to 100° C./min, more preferably from 25° C./min to 85° C./min.

In step d) of the process of the invention, the "quenching" step, the temperature is lowered relative to step c) in such a way that the state attained in step c) is "frozen" with regard to the isocyanurate and secondary component content. This is brought about by guiding the isocyanurate-containing isocyanate mixture which comprises inactive isocyanate group trimerization catalyst and is obtained in step c) continuously through a third dwell zone at a temperature in the range from 10° C. to 100° C., preferably in the range from 15° C. to 80° C., more preferably in the range from 20° C. to 50° C., to obtain the desired isocyanurate-containing isocyanate mixture (comprising inactive isocyanate group trimerization catalyst). In one embodiment, the temperature in step d) is always kept below the temperature of step b).

The dwell time of the isocyanurate-containing isocyanate mixture comprising isocyanate group trimerization catalyst in the third dwell zone is preferably in the range from 0.5 min to 120 min, more preferably in the range from 1 min to 60 min and most preferably in the range from 1 min to 10 min. The third dwell zone, like the first and second, may be a reaction device known to the person skilled in the art, especially a stirred tank, optionally with upstream heat exchanger, or—preferably—a temperature-controllable tubular reactor that may optionally contain mixing elements. In the case of a stirred tank with an upstream heat exchanger, the isocyanurate-containing isocyanate mixture which comprises inactive isocyanate group trimerization catalyst and is obtained in step c) is cooled down to the temperature of step d) in this heat exchanger by indirect cooling; if no heat exchanger is provided, the cooling is effected solely by appropriate control of the stirred tank temperature. In the case of a tubular reactor, this is cooled correspondingly. In any case, it is preferable to adjust the temperature of the isocyanurate-containing isocyanate mixture comprising inactive isocyanate group trimerization catalyst which is obtained in step c) to the temperature in step d) at a rate of temperature change in the range from 15° C./min to 200° C./min, preferably in the range from 15° C./min to 125° C./min, more preferably in the range from 35° C./min to 105° C./min.

It is possible to use one stirred tank each as the first, second and third dwell zone, optionally (and preferably) with an upstream heat exchanger (called a stirred tank cascade). However, it is particularly preferable to use one temperature-controllable tubular reactor, optionally containing mixing elements, each as the first, second and third dwell zone.

The process of the invention can be coupled directly to an isocyanate production plant by withdrawing the first and second isocyanate component each from the product stream (obtained continuously) from the corresponding isocyanate production plant (there may optionally be a buffer tank connected in between). This enables "fully continuous" production of isocyanurate-containing isocyanate mixtures. Processes and plants for preparation of isocyanates are known to the person skilled in the art; reference is made here by way of example to international patent application WO 2017/050776 A1 and the literature cited therein. This embodiment is suitable especially when one of the two isocyanate components is MMDI and the other is a mixture of MMDI and PMDI. For instance, a suitable MMDI fraction can be obtained by purifying and fractionating the isocyanate stream 140 described in WO 2017/050776 A1. A suitable mixture of MMDI and PMDI is the stream 141 comprising polymeric isocyanate fractions that is described in WO 2017/050776 A1.

It is of course also possible to take the first and second isocyanate components each from a storage or transport vessel (for example the tank of a tanker truck, goods wagon or cargo ship) unconnected to the corresponding isocyanate production plant. This increases the flexibility of the process since the production of the desired mixture can also take place at sites with no spatial proximity to an isocyanate production plant.

EXAMPLES

Materials Used

"Desmodur 44M", "44M" for short (MMDI with a composition of 98.5% 4,4'-MMDI and 1.5% 2,4'-MMDI and a viscosity at 40° C. of 4.00 mPa·s; Covestro Deutschland AG, Leverkusen).

"Desmodur V20", "44 V20" for short (mixture of MMDI and PMDI with a proportion by mass of MMDI in the range from 40% to 44% and a viscosity at 40° C. of 80.0 mPa·s; Covestro Deutschland AG, Leverkusen).

Benzoyl chloride (99%, Aldrich, Steinheim).

Tris(dimethylaminomethyl)phenol (Araldite Hardener HY 960, Huntsman Advanced Materials, Basle).

Triethyl phosphate (Levagard TEP, Lanxess, Cologne).

Test Conditions

Viscosity by rotary viscometer (DIN 53019-1: 2008-09).

Isocyanate content (DIN EN ISO 11909: 2007-05).

The uretdione content was determined by IR spectroscopy.

The PIR content is calculated by the following formula:

% PIR=[(starting NCO−final NCO)/(0.5·starting NCO)]·100

The commencement of crystallization of the product present in a closable sample tube is determined visually in a thermostat with a temperature ramp beginning at 25° C. with a delta of −2.5 K/day.

Example 1 (Comparative Example): Preparation of an Isocyanurate-Containing MMDI/PMDI Mixture by a Discontinuous Process with Exclusively Chemical Deactivation of the Catalyst In a stirred and heated 10 L glass three-neck flask equipped with a reflux condenser and overhead stirrer under $N_2$ blanketing, 3.00 kg of 44M and 2.00 kg of 44 V20 were mixed with 90.2 g of catalyst solution (8.0% by mass of tris(dimethylaminomethyl)phenol in TEP) and stirred at 80° C. and ambient pressure for 1 h. The end of the reaction was determined by determining the NCO content of the reaction mixture at intervals of 15 min. On attainment of a content of 27.5% by mass of NCO, 3.6 g of benzoyl chloride as stopper was added, and the mixture was stirred at 80° C. for a further 10 min. After cooling to room temperature, cloudiness occurred after 5 hours.

Analysis: see table 1.

Example 2 (Comparative Example): Preparation of an Isocyanurate-Containing MMDI/PMDI Mixture by a Discontinuous Process with Thermal Catalyst Deactivation at 140° C.

The procedure was as in example 1, except that, after the trimerization at 80° C., the reaction mixture was heated up to 140° C. within 25 min and was then allowed to cool down to room temperature. After it had been cooled down to room temperature, cloudiness was observed, and had increased the next day.

Example 3 (Comparative Example): Preparation of an Isocyanurate-Containing MMDI/PMDI Mixture by a Discontinuous Process with Thermal Catalyst Deactivation at 200° C.

The procedure was as in example 1, except that, after the trimerization at 80° C., the reaction mixture was heated up to 200° C. within 34 min and was then allowed to cool down to room temperature. After it had been cooled down to room temperature, cloudiness was observed, and had increased the next day.

Example 4 (Comparative Example): Preparation of an Isocyanurate-Containing MMDI/PMDI Mixture by a Semicontinuous Process (without Thermal Aftertreatment; without Chemical Catalyst Inactivation)

371.3 g/h of 44M and 247.5 g/h of 44 V20 were mixed continuously in a static mixer at a temperature of 40° C. The volume flow of the departing isocyanate mixture of 44 V20 and 44M was divided. A thinner capillary was introduced into a part of the volume flow, through which the catalyst solution (8.0% by mass of tris(dimethylaminomethyl)phenol in TEP) was guided at 12.3 g/h. The exit of the capillary and of the feed tube for the isocyanate mixture that surrounded it opened into a static mixer that also functioned as heat exchanger. The three streams (two streams of isocyanate mixture and one stream of catalyst solution) met in this static mixer and were mixed at 22° C., trimerized at 80° C. with a dwell time of 45 minutes, and then collected in a collecting vessel in which the product cooled down. Product samples were taken upstream of the collecting vessel for analysis. The product had a distinct drop in NCO after a storage time of 24 h (RT) (cf. table 1) and had solidified in the collecting vessel after 7 days.

Analysis: see table 1.

Example 5 (Comparative Example): Preparation of an Isocyanurate-Containing MMDI/PMDI Mixture by a Semicontinuous Process (without Thermal Aftertreatment; with Chemical, Irreversible Catalyst Inactivation)

The procedure was as in example 4, except that the product samples taken upstream of the collecting vessel for analysis were admixed with 0.08% by mass (based on the mass of sample) of benzoyl chloride to deactivate the catalyst. The chemically stopped product was stable and showed slight cloudiness after cooling.

Analysis: see table 1.

Example 6 (Inventive): Preparation of an Isocyanurate-Containing MMDI/PMDI Mixture by a Continuous Process with Irreversible, Thermal Catalyst Inactivation and "Quenching"

The procedure was as in example 4, except that the trimerization at 80° C. with a dwell time of 45 min (corresponding to step b) of the process of the invention) was followed by a further continuous-flow dwell zone in which the reaction mixture from step b) was heated to 200° C. within 4 min (corresponding to step c) of the process of the invention), which was followed by a last continuous-flow dwell zone in which the reaction mixture from step c) was cooled down to ambient temperature within 4 min (corresponding to step d) of the process of the invention). The product leaving this last dwell zone was collected in a collecting vessel. Product samples were taken upstream of the collecting vessel for analysis. The product had no cloudiness, and the NCO content was still at the same value as at the start after 24 h (see table 1).

TABLE 1

Analysis data of the starting MMDI/PMDI mixture and the products prepared in examples 1 to 6.

| | NCO det. after 0 h [% by mass] | NCO det. after 24 h [% by mass] | UD[a] based on MW 500 [% by mass] | Appearance | PIR content calculated [% by mass] | Viscosity at 25° C. [mPa · s] | Start of crystallization [° C.] |
|---|---|---|---|---|---|---|---|
| MMDI/PMDI mixture (44M + 44 V20) | 32.5 | n. d. | 0.18 | clear | 0 | 24 | n. d. |
| Example 1 (comp.) | n. d. | 27.1 | 1.11 | slightly cloudy | 33.2 | 854 | 10 |
| Example 2 (comp.) | 27.5 (27.0)[b] | 26.9 | 1.59 | very cloudy | 34.5 | 1470 | n. d.[c] |
| Example 3 (comp.) | 27.6 (26.9)[b] | 26.1 | 2.04 | very cloudy | 39.4 | 3470 | n. d.[c] |
| Example 4 (comp.) | 25.7[d] | 22.9 | n. d. | solidified at RT | | | |
| Example 5 (comp.) | 27.3 | 27.5 | 1.11 | clear | 30.8 | 525 | 2.5 |
| Example 6 (inv.) | 27.5 | 27.5 | 0.82 | clear | 30.8 | 550 | 0 |

[a]UD = uretdione.
[b]The value reported in brackets indicates the NCO content after the end of the heating to 140° C. or 200° C.
[c]The start of crystallization could not be reliably determined owing to the high cloudiness and high viscosity (n. d. = not determined).
[d]As a result of the time delay between sampling and NCO titration of about 15 min, the solution continues to react without chemical stopper, and the NCO content varies from that in examples 2 and 3, and 5 and 6.

Example 1 shows that the batchwise performance of the process with pure chemical catalyst deactivation leads to an elevated uretdione content, elevated viscosity, cloudiness and elevated crystallization temperature. If the chemical catalyst deactivation is replaced by a thermal catalyst deactivation at 140° C. (example 2), there is a further rise in uretdione content and viscosity and a further increase in cloudiness. If the deactivation temperature is increased further to 200° C., these unwanted effects increase further, whereas, when the process of the invention is employed with the same deactivation temperature (example 6, deactivation likewise at 200° C.), it is possible to obtain a clear product having a low uretdione content and constant NCO value that begins to crystallize only at 0° C. This process is also superior to the semicontinuous processes without (example 4) or with exclusively chemical (example 5) catalyst deactivation.

The invention claimed is:

1. A process for preparing an isocyanurate-containing isocyanate mixture, comprising:
   a) continuously providing an isocyanate mixture comprising isocyanate group trimerization catalyst by mixing a first isocyanate component, a second isocyanate component different from the first isocyanate component, and an isocyanate group trimerization catalyst;
   b) continuously guiding the mixture provided in step a) through a first dwell zone at a temperature in the range from 50° C. to 120° C. to obtain a uretdione- and isocyanurate-containing isocyanate mixture comprising the isocyanate group trimerization catalyst;
   c) continuously guiding the mixture obtained in step b) through a second dwell zone at a temperature in the range from 160° C. to 220° C. to obtain an isocyanurate-containing isocyanate mixture comprising inactive isocyanate group trimerization catalyst, wherein the guiding through the second dwell zone is optionally preceded by the addition of a stopper at a temperature in the temperature range from 50° C. to 120° C.;
   d) continuously guiding the mixture obtained in step c) through a third dwell zone at a temperature in the range from 10° C. to 100° C. to obtain the isocyanurate-containing isocyanate mixture.

2. The process as claimed in claim 1, in which step a) comprises:
   continuously introducing the first isocyanate component, the second isocyanate component, and the isocyanate group trimerization catalyst into a mixing device and mixing the first isocyanate components the second isocyanate component introduced, and the trimerization catalyst introduced to obtain the isocyanate mixture comprising isocyanate group trimerization catalyst.

3. The process as claimed in claim 1, in which step a) comprises:
   a.1) continuously introducing the isocyanate group trimerization catalyst and one of the first isocyanate component and the second isocyanate component and mixing the isocyanate component introduced and the isocyanate group trimerization catalyst introduced to obtain a mixture comprising the isocyanate group trimerization catalyst and one of the first isocyanate component and the second isocyanate component; and
   a.2) continuously introducing the mixture which is obtained in step a.1) and the isocyanate component not introduced in step a.1) into a second mixing device and mixing the resulting mixture to obtain the isocyanate mixture comprising isocyanate group trimerization catalyst.

4. The process as claimed in claim 1, in which step a) comprises:
   a.1) continuously introducing the first isocyanate component and the second isocyanate component into a first mixing device and mixing the isocyanate components introduced in the first mixing device to obtain an isocyanate mixture; and
   a.2) continuously introducing the isocyanate group trimerization catalyst and the isocyanate mixture obtained in step a.1) into a second mixing device and mixing the isocyanate mixture introduced and the isocyanate group trimerization catalyst-introduced to obtain the isocyanate mixture comprising isocyanate group trimerization catalyst.

5. The process as claimed in claim 4, in which, in step a), the isocyanate mixture leaving the mixing device continuously, before being introduced into the second mixing device, is guided through a dwell zone upstream of the second mixing device.

6. The process as claimed in claim 1, in which step a) is conducted at a temperature in the range from 10° C. to <50° C.

7. The process as claimed in claim 1, in which the nature and composition of the first isocyanate component and the second isocyanate component are matched to one another in such a way that the isocyanurate-containing isocyanate mixture obtained in step d) has an NCO content in the range from 24% by mass to 32% by mass and a viscosity in the range from 50 mPa·s (25° C.) to 40,000 mPa·s (25° C.).

8. The process as claimed in claim 1, in which the first isocyanate component and second isocyanate component each comprise (i) methylene diphenylene diisocyanate, (ii) a mixture of methylene diphenylene diisocyanate and polymethylene polyphenylene polyisocyanate, (iii) tolylene diisocyanate or a (iv) mixture of (i) or (ii) with (iii).

9. The process as claimed in claim 1, in which the isocyanate group trimerization catalyst used in step a) comprises one or more of a quaternary ammonium hydroxide, an alkali metal hydroxide, an alkali metal alkoxide, a trialkylphosphine, a para-substituted pyridine, an organometallic salt, a Lewis acid and an alkali metal salt of an organic acid.

10. The process as claimed in claim 9, in which a stopper comprising an organic acid chloride is added in step c), where the organic acid chloride is used in a molar ratio of acid chloride:isocyanate group trimerization catalyst in the range from 1:3 to 1:1.

11. The process as claimed in any of claim 1, in which the isocyanate group trimerization catalyst used in step a) comprises an alkylaminoalkylphenol.

12. The process as claimed in claim 11, in which no stopper is used to inactivate the isocyanate group trimerization catalyst.

13. The process as claimed in claim 5, in which the dwell zone upstream of the second mixing device (M2) is a tubular reactor optionally containing mixing elements.

14. The process as claimed in claim 1, in which the first, second and third dwell zone each comprise a stirred tank, optionally with upstream heat exchanger, or a temperature-controllable tubular reactor optionally containing mixing elements.

15. The process as claimed in claim 1, in which the first isocyanate component and second isocyanate component are produced in a corresponding isocyanate production plant, wherein
   the first isocyanate component and the second isocyanate component are each taken from a product stream from the corresponding isocyanate production plant, or the first isocyanate component and the second isocyanate component are each taken from a storage or transport vessel unconnected to the corresponding isocyanate production plant.

16. The process as claimed in claim 1, in which the temperature of the isocyanurate-containing isocyanate mixture comprising inactive isocyanate group trimerization catalyst which is obtained in step c) is adjusted to the temperature in step d) at a rate of temperature change in the range from 15° C./min to 200° C./min.

17. The process as claimed in claim 1, wherein the uretdione- and isocyanurate-containing isocyanate mixture comprising isocyanate group trimerization catalyst obtained in step b) is continuously guided through the second dwell zone at a temperature in the range from 160° C. to 220° C.

18. The process as claimed in claim 1, wherein the uretdione- and isocyanurate-containing isocyanate mixture comprising isocyanate group trimerization catalyst obtained in step b) is continuously guided through the second dwell zone at a temperature in the range from 170° C. to 215° C.

19. The process as claimed in claim 1, wherein the uretdione- and isocyanurate-containing isocyanate mixture comprising isocyanate group trimerization catalyst obtained in step b) is continuously guided through the second dwell zone at a temperature in the range from 180° C. to 210° C.

20. The process as claimed in claim 1, wherein the temperature of the isocyanurate-containing isocyanate mixture comprising inactive isocyanate group trimerization catalyst obtained in step c) is adjusted to the temperature in the range from 10° C. to 100° C. in step d) at a rate of temperature change of 15° C./min to 200° C./min.

* * * * *